US008483566B2

(12) United States Patent
Sun

(10) Patent No.: US 8,483,566 B2
(45) Date of Patent: Jul. 9, 2013

(54) SUB-OCTAVE RF STACKING FOR OPTICAL TRANSPORT AND DE-STACKING FOR DISTRIBUTION

(75) Inventor: Chen-Kuo Sun, Escondido, CA (US)

(73) Assignee: Titan Photonics, Inc., Fremont, CA (US)

( * ) Notice: Subject to any disclaimer, the term of this patent is extended or adjusted under 35 U.S.C. 154(b) by 328 days.

(21) Appl. No.: 13/045,250

(22) Filed: Mar. 10, 2011

(65) Prior Publication Data

US 2012/0230692 A1    Sep. 13, 2012

(51) Int. Cl.
  *H04J 14/00*  (2006.01)
(52) U.S. Cl.
  USPC .............................. 398/115; 398/66; 398/71
(58) Field of Classification Search
  USPC ...................................... 398/66–72
  See application file for complete search history.

(56) References Cited

U.S. PATENT DOCUMENTS

| | | | |
|---|---|---|---|
| 5,596,436 A * | 1/1997 | Sargis et al. .................... | 398/76 |
| 5,680,104 A | 10/1997 | Slemon et al. | |
| 5,777,768 A | 7/1998 | Korevaar | |
| 6,091,074 A | 7/2000 | Korevaar | |
| 6,118,131 A | 9/2000 | Korevaar | |
| 6,353,490 B1 | 3/2002 | Singer et al. | |
| 6,928,248 B2 | 8/2005 | Achour et al. | |
| 6,944,403 B2 | 9/2005 | Margalit et al. | |
| 7,146,103 B2 * | 12/2006 | Yee et al. ......................... | 398/68 |
| 7,428,385 B2 * | 9/2008 | Lee et al. ...................... | 398/100 |
| 8,055,136 B2 * | 11/2011 | Pescod et al. ................. | 398/115 |
| 2002/0012495 A1 * | 1/2002 | Sasai et al. ....................... | 385/24 |
| 2005/0108003 A1 | 5/2005 | Kikuchi et al. | |
| 2006/0140114 A1 | 6/2006 | Cochran | |
| 2007/0032256 A1 | 2/2007 | Kolze | |
| 2007/0150927 A1 | 6/2007 | Chapman | |
| 2009/0274462 A1 * | 11/2009 | Yu ................................... | 398/68 |

* cited by examiner

*Primary Examiner* — Nathan Curs
(74) *Attorney, Agent, or Firm* — Nydegger and Associates

(57) ABSTRACT

A system for transporting a plurality of digital signals includes a head-end unit for routing each digital signal to a particular modem, according to address information in the signal. At its respective modem, each digital signal is mixed for further transmission on a unique, modem-specific, radio frequency ($f_n$) that is predisposed for a sub-octave transmission. A first converter then "stacks" a plurality of the different digital signals onto a common wavelength ($\lambda$) for transmission as an optical signal over an optical fiber. At the receive end of the optical fiber, a second converter "de-stacks" the plurality of digital signals, and segregates them according to their respective unique radio frequency ($f_n$). A distribution unit then directs each unique radio frequency signal to an addressed node for further transmission over a secondary network.

19 Claims, 1 Drawing Sheet

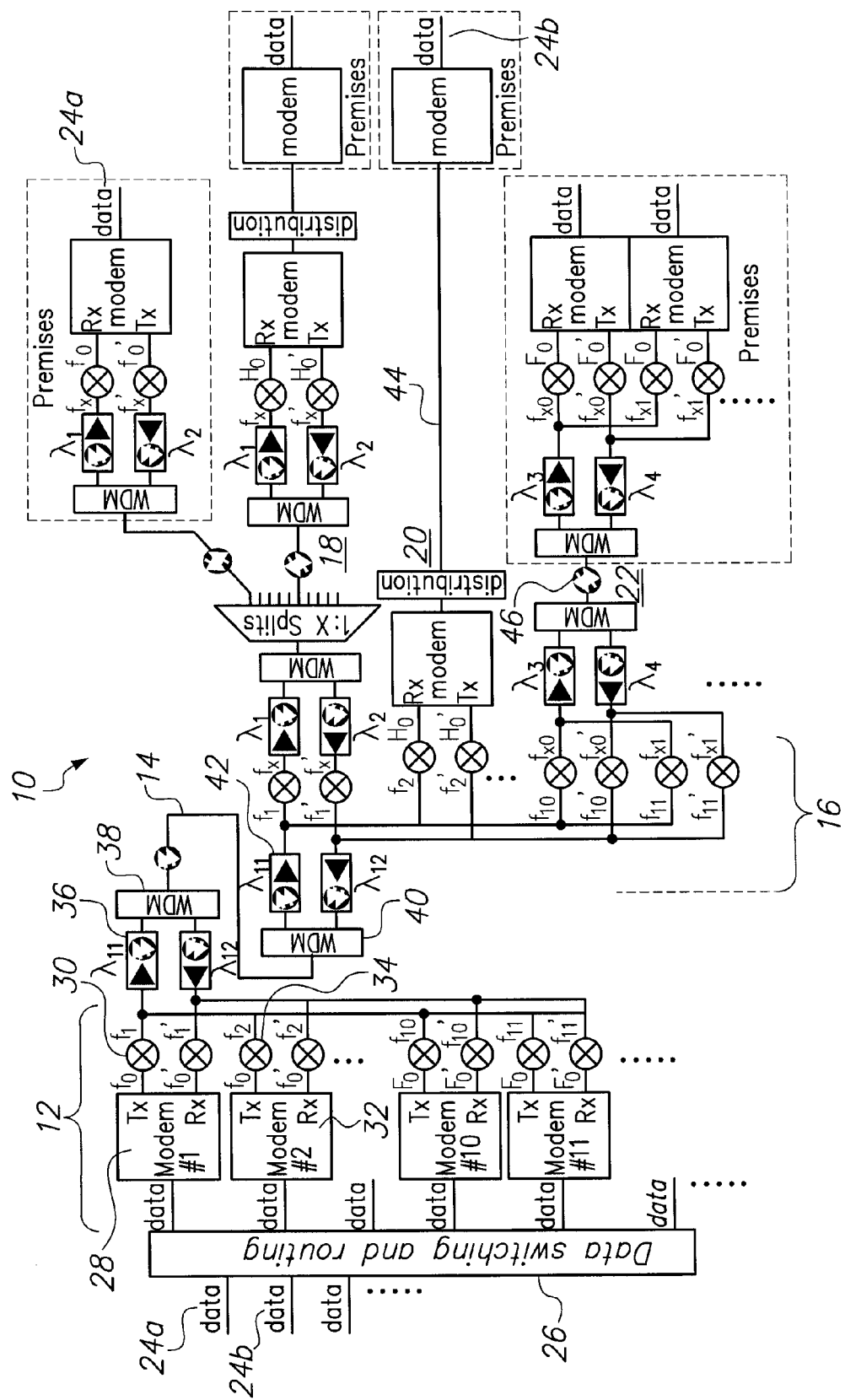

US 8,483,566 B2

SUB-OCTAVE RF STACKING FOR OPTICAL TRANSPORT AND DE-STACKING FOR DISTRIBUTION

FIELD OF THE INVENTION

The present invention pertains generally to optical systems and methods for transporting digital signals. More particularly, the present invention pertains to systems and methods for simultaneously transporting a plurality of different digital signals, in sub-octave transmissions, over a relatively long optical fiber. The present invention is particularly, but not exclusively, useful for systems and methods that "stack" a plurality of different digital signals onto a same wavelength for transmission as an optical signal, and then, after the optical transmission, "de-stack" the digital signals for their respective individual use.

BACKGROUND OF THE INVENTION

It is well known that when optical signals are transmitted over an optical fiber, they are particularly susceptible to second order distortions. Indeed, these distortions become more pronounced with an increase in the length of the optical fiber. As is also known, however, from the disclosure of U.S. application Ser. No. 12/980,008 for an invention entitled "Passive Optical Network with Sub-Octave Transmission," which is owned by the same assignee as the present invention, and which is incorporated herein by reference, the unwanted second order distortions in a transmitted optical signal can be effectively filtered out when the radio frequency carriers are selected from a sub-octave bandwidth. Consequently, a clearer signal is transmitted.

In addition to the clarity of received signals, many present-day networks also need to be able to handle increased traffic loads. A consequence of this is that the increased traffic will require the use of additional, different type transmission networks. In any event, good signal quality and a capacity to simultaneously transport many digital signals over an optical network is desirable.

In light of the above, it is an object of the present invention to provide a system and method for optically transporting a plurality of digital signals that increases the traffic capacity of an optical network by modulating the digital signals onto different modem-specific frequencies ($f_n$) that are each predisposed for a sub-octave transmission. Another object of the present invention is to provide a system and method for "stacking" digital signals according to their respective carrier frequency ($f_n$) onto a same optical signal of wavelength "$\lambda$". Yet another object of the present invention is to provide a system and method that maintains an effective separation between digital signals as they are being transported over an optical fiber. Still another object of the present invention is to provide a system and method for optically transporting a plurality of digital signals over an optical fiber that is easy to use, relatively easy to manufacture, and comparatively cost effective.

SUMMARY OF THE INVENTION

There are at least three essential functions that are performed by the present invention. They are: 1) mixing different digital signals (i.e. data) onto different, unique, modem-specific, radio frequencies ($f_n$) that are collectively predisposed for sub-octave optical transmissions; 2) "stacking" a plurality of these digital signals as an optical signal for simultaneous transmission on an optical signal over a relatively long optical fiber; and 3) "de-stacking" the plurality of digital signals from the optical signal, after transmission, for subsequent transmission of the individual signals over different networks to their respective destination address.

For purposes of the present invention, the term "stacking" means to impose a plurality of different, radio frequency, digital signals onto a same optical wavelength ($\lambda$). The plurality of digital signals are then collectively transmitted as an optical signal through an optical fiber. In detail, for stacking purposes, each digital signal will have its own unique radio frequency carrier ($f_n$). Importantly, the unique radio frequency carrier ($f_n$) will be selected with two requirements in mind. One is to avoid interference with other digital signals during the stacking process, and the other is to allow for a sub-octave transmission of the digital signals.

Prior to stacking, all digital signals within a system are likely to be modulated onto a substantially same radio frequency "$f_0$". Each digital signal will then need to be further mixed onto its own unique radio frequency carrier "$f_n$". As indicated above, each "$f_n$" is selected so it is effective for a sub-octave transmission. Also, the unique "$f_n$" for each digital signal must be sufficiently different from the "$f_n$" of every other digital signal in the system so they can be "stacked" on the same wavelength ($\lambda$) for transmission as a same optical signal.

By way of example, consider the stacking of "n" different digital signals, where "n" is an integer from 1 to 10. In general, depending on the origin of the digital signal, the initial radio frequency "$f_0$" for each of the "n" different digital signals will likely be substantially the same ($f_0$), and will be somewhere between 4 MHz and 100 MHz. Note: these initial carrier frequencies do not allow for a sub-octave transmission. Thus, in order to become capable of a sub-octave transmission, the initial radio frequency "$f_0$" for each digital signal is mixed to a higher frequency that is sub-octave capable. In particular, for the present invention, the resultant unique radio frequency "$f_n$" will be in a frequency range between 1[n−1]04 MHz and 1[n]00 MHz. For example, where three different digital signals are identified as n=1, n=2 and n=3, the respective frequency ranges for the associated digital signal will be 1004 MHz to 1100 MHz; 1104 MHz to 1200 MHz; and 1204 MHz to 1300 MHz. These exemplary frequency ranges, and other ranges that are similarly determined for "n" equal to 4 through 10, provide for stacking the plurality of unique radio frequency signals. More specifically, once each digital signal has been mixed to establish its own unique radio frequency carrier ($f_n$), the digital signals can be individually imposed onto a same wavelength ($\lambda$) for transmission as an optical signal. In line with the above, this process is hereinafter referred to as "stacking."

For purposes of the present invention, the term "de-stacking" essentially means the reversal of the "stacking" process described above. More specifically, during de-stacking, each digital signal is removed from the wavelength ($\lambda$), and is restored as a radio frequency signal to its originally unique radio frequency carrier ($f_n$). Subsequent mixing from "$f_n$" back to "$f_0$" then allows each digital signal to again be conventionally used.

Structurally, the system includes a head-end unit that routes each digital signal to a particular modem. Specifically, this routing is accomplished according to address information that is included in the digital signal. As a practical matter, the present invention anticipates that all digital signals will be initially carried on a substantially same radio frequency ($f_0$) that is in a frequency range of 4-100 MHz. At the modem, however, each digital signal is mixed for further transmission on a modem-specific radio frequency ($f_n$). In detail, each radio frequency ($f_n$) is selected with two considerations in mind. As noted above, these considerations are: 1) the frequency range of one modem-specific ($f_n$) should not overlap or interfere with that of another; and 2) the frequency ($f_n$) should be predisposed for a sub-octave transmission.

Along with the "stacking" capability of the present invention, an important structural element of the system is its optical fiber. As envisioned for the present invention, the optical fiber will necessarily be relatively long (e.g. longer than 1 km). Consequently, the optical signal that is being carried on the optical fiber is particularly susceptible to second order distortions. Thus, there is a need for limiting the usable frequency ranges for the carrier of each digital signal to a sub-octave capability that will effectively eliminate the second order distortions. Despite this limitation, however, the present invention appreciates that several such frequency ranges can still be "stacked."

In order to transmit digital signals downstream over the optical fiber, the system includes an up converter that is connected to a first end of the optical fiber. Importantly, it is this up converter that is used for stacking the plurality of digital signals, with their respectively different unique radio frequencies ($f_n$), onto a common wavelength (e.g. $\lambda_{11}$). The system also includes a down converter that is connected to a second end of the central optical fiber for de-stacking the plurality of digital signals from the wavelength "$\lambda_{11}$". To provide for two-way transmissions, the system also envisions the capability wherein digital signals can also be transmitted in an opposite direction over the optical fiber using a second wavelength (e.g. $\lambda_{12}$).

During a de-stacking operation, the digital signals can be segregated according to their respective unique radio frequencies ($f_n$). A distribution unit is then provided for directing each unique radio frequency signal to a node in accordance with its address information. Subsequent transmission of the digital signal from the particular node can then be made over a secondary network that is dedicated to the particular node. For these subsequent transmissions, the present invention envisions that the secondary network may be any of several well known type networks; to include networks such as a Passive Optical Network (PON), an Ethernet Over Coaxial (EOC), or a Point-to-Point (P2P).

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

The FIGURE is a schematic drawing of a transmission system in accordance with the present invention.

DESCRIPTION OF THE PREFERRED EMBODIMENTS

Referring to the FIGURE, a system for transporting digital signals is shown and is generally designated 10. As shown, the system 10 includes a head-end unit 12 that is electronically connected to an optical fiber 14. Also, the optical fiber 14 is shown optically connected to a distribution unit 16 that, in turn, may be selectively connected to a plurality of different networks. For purposes of disclosure, and by way of example, the FIGURE shows that the distribution unit 16 is connected to a Passive Optical Network (PON) 18, also to an Ethernet Over Coaxial (EOC) network 20, and to a Point-to-Point (P2P) network 22. There may be either more or fewer such networks. The networks 18, 20 and 22 are only exemplary.

In an operation of the present invention, a digital signal 24 (i.e. data) is created by a user of the system 10. Although only the digital signals 24a and 24b are identified in the FIGURE, it is to be appreciated that there may be many such digital signals 24 being transported through the system 10 at any given time. In general, all of the different digital signals 24 will somehow be initially carried on a substantially same radio frequency ($f_0$). Typically, this "$f_0$" will be in a frequency range between 4 and 100 MHz. In any event, once a digital signal 24 has been generated (e.g. digital signal 24a), and it has been appropriately addressed, it will be sent to a router 26. From there, in accordance with the address information included in the digital signal 24a, the signal 24a will be sent to a modem, such as the modem 28. At the modem 28, the signal 24a will be processed, and it will have its frequency converted from "$f_0$" to a frequency "$f_n$".

It is an important aspect of the present invention that the unique radio frequency "$f_n$" is modem-specific. In particular, "n" may be any integer from 1 to 10. Each value of "n", however, is associated with a particular modem. Thus, with n=1 being associated with modem 28, the initial frequency "$f_0$" will be changed at the modem 28 (by mixer 30) to the unique radio frequency "$f_1$". Likewise, with n=2 being associated with the modem 32, the initial frequency "$f_0$" will be changed at modem 32 (by mixer 34) to the unique radio frequency "$f_2$". Thus, modem-specific carrier frequencies ($f_n$) will be assigned by as many modems as there may be in the system 10. Further, each "$f_n$" will be selected from a frequency range between 1[n−1]04 MHz and 1[n]00 MHz. Specifically, this is done to provide the capability for stacking a plurality of unique radio frequency signals 24 onto a common wavelength (e.g. $\lambda_{11}$). For example, with n=1 and n=2, the respective "$f_n$" (i.e. $f_1$ and $f_2$) will be selected from frequency ranges of 1004 to 1100 MHz and 1104 to 1200 MHz, respectively.

At the converter 36 and wavelength-division multiplexer (WDM) 38, the various modem-specific frequencies ("$f_n$") are stacked onto the common wavelength $\lambda_{11}$. They are then transmitted as an optical signal over the optical fiber 14. At the WDM 40 and converter 42, the various digital signals 24 are de-stacked from the optical signal ($\lambda_{11}$). As they are de-stacked, the digital signals 24 are returned to their previously unique radio frequency signal "$f_n$". After being de-stacked, the digital signals 24 are further routed by the distribution unit 16 to a premises according to the address in the respective digital signal 24. For example, in the FIGURE, the digital signal 24a, with a radio frequency "$f_1$", is shown being routed to a secondary PON network 18. In this case, for transmission in the PON network 18, the digital signal 24a will need to, again, be converted. This time, however, the optical signal will have a different exemplary wavelength "$\lambda_1$". The FIGURE also shows that the digital signal 24b, with radio frequency "$f_2$", is routed to the EOC network 20 for further transmission over a copper line 44 to a premises in the network 20. In yet another instance, a digital signal 24, with a radio frequency "$f_{10}$", is shown in the FIGURE being routed into a P2P network 22 by the distribution unit 16 for further transmission to a premises in the network 22 over the optical fiber 46.

While the particular Sub-Octave RF Stacking for Optical Transport and De-Stacking for Distribution as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A system for transporting a plurality of digital signals which comprises:
    a head-end unit for respectively routing each digital signal to a particular modem according to address information in the digital signal, wherein all digital signals are initially carried on a substantially same radio frequency ($f_0$) and each initially carried digital signal is then mixed for further transmission on one of a set of unique radio frequencies, wherein each said unique radio frequency in the set is determined by the respective modem;
    an optical fiber having a first end and a second end;
    a first converter connected to the first end of the central optical fiber for stacking the plurality of digital signals, with their respectively unique radio frequency, onto a common wavelength ($\lambda$) for transmission as an optical signal over the optical fiber;
    a second converter connected to the second end of the central optical fiber for de-stacking the plurality of digital signals and segregating each digital signal according to its respective unique radio frequency; and
    a distribution unit for directing each unique radio frequency signal to an addressed node, wherein further transmission from the node is over a secondary network dedicated to the node.

2. A system as recited in claim 1 wherein there are an (n) number of modems for the respectively unique radio frequencies, with the initial radio frequency ($f_0$) being in a frequency range of 4-100 MHz, and with each unique radio frequency being in a frequency range between 1[n−1]04 MHz and 1[n]00 MHz to provide for stacking the plurality of unique radio frequency signals.

3. A system as recited in claim 2 wherein each unique radio frequency in the set is selected to enable a sub-octave transmission of the digital signal over the optical fiber.

4. A system as recited in claim 3 wherein (n) is an integer from 2 to 10.

5. A system as recited in claim 1 wherein the common wavelength ($\lambda$) is a first wavelength ($\lambda_1$) for transmitting digital signals downstream over the optical fiber from the first converter to the second converter, and further wherein digital signals are transmitted upstream over the optical fiber from the second converter to the first converter on a second wavelength ($\lambda_2$).

6. A system as recited in claim 1 wherein the secondary network is selected from a group of networks comprising Passive Optical Network (PON), Ethernet Over Coaxial (EOC), and Point-to-Point (P2P).

7. A system as recited in claim 1 wherein the optical fiber has a length greater than 1 km.

8. A method for transporting a digital signal through a system, the method comprising the steps of:
    addressing a digital signal, wherein the address requires transmission of the digital signal to a premises in the system via a particular modem;
    modulating the digital signal onto a radio frequency ($f_0$) at the particular modem;
    mixing the radio frequency ($f_0$) to a unique radio frequency signal ($f_1$), wherein ($f_1$) is unique to the particular modem;
    transferring the digital signal on the unique radio frequency ($f_1$) to a first converter;
    stacking the radio frequency ($f_1$) digital signal with a signal having radio frequency ($f_2$) onto an optical wavelength ($\lambda$) at the first converter;
    transmitting the stacked signals, as an optical signal, downstream over an optical fiber from the first converter to a second converter;
    de-stacking the signals at the second converter to segregate the radio frequency ($f_1$) digital signal from the radio frequency ($f_2$) signal according to their respective unique radio frequency; and
    routing the de-stacked radio frequency ($f_1$) signal to a node according to address information in the digital signal for further downstream transmission to the premises.

9. A method as recited in claim 8 wherein the addressing step includes the steps of:
    identifying a modem for accomplishing the modulating step and the mixing step; and
    naming a premises for use in the distributing step.

10. A method as recited in claim 8 wherein there are an (n) number of modems establishing a set of (n) unique radio frequencies and the method further comprises the steps of:
    having the initial radio frequency ($f_0$) be in a frequency range between 4 MHz and 100 MHz; and
    establishing each unique radio frequency ($f_n$) in a frequency range between 1[n−1]04 MHz and 1[n]00 MHz to provide for use in the stacking step.

11. A method as recited in claim 10 wherein each said unique radio frequency is selected to enable a sub-octave transmission of the digital signal over the optical fiber.

12. A method as recited in claim 10 wherein (n) is an integer from 2 to 10.

13. A method as recited in claim 8 wherein the optical fiber has a length greater than 1 km.

14. A method as recited in claim 8 wherein the distributing step comprises the steps of:
    selecting a secondary network from a group of networks comprising Passive Optical Network (PON), Ethernet Over Coaxial (EOC), and Point-to-Point (P2P); and
    remixing the digital signals to restore the radio frequency ($f_0$) for use of the digital signal at the premises.

15. A system for transporting a digital signal, wherein the digital signal is carried on a radio frequency ($f_1$), the system comprising:
    a means for stacking the ($f_1$) radio frequency digital signal onto an optical wavelength ($\lambda$) together with another digital signal being carried on a radio frequency ($f_2$);
    an optical fiber for transmitting the stacked digital signals, as an optical signal, downstream over the optical fiber;
    a means for de-stacking the digital signals, after transmission over the optical fiber, to segregate the digital signals according to their respective unique radio frequency;
    a head-end unit for addressing the ($f_1$) radio frequency digital signal to a premises in the system via a particular modem, and for modulating the digital signal onto the unique radio frequency signal ($f_1$), wherein ($f_1$) is unique to the particular modem; and
    a distribution unit for directing each of the de-stacked signals to a respective node according to address information in the de-stacked digital signal for further downstream transmission to the premises.

16. A system as recited in claim 15 wherein there are an (n) number of modems for the respectively unique radio frequencies wherein (n) is an integer from 1 to 10, and wherein each unique radio frequency is in a frequency range between 1[n−1]04MHz and 1[n]00 MHz.

17. A system as recited in claim 16 wherein each said unique radio frequency is selected to enable a sub-octave transmission of the digital signal over the optical fiber.

18. A system as recited in claim 15 wherein the optical fiber has a length greater than 1 km.

19. A system as recited in claim 15 wherein the distribution unit directs each de-stacked signal via a specified node to a secondary network selected from a group of networks comprising a Passive Optical Network (PON), an Ethernet Over Coaxial (EOC), and a Point-to-Point (P2P).

\* \* \* \* \*